United States Patent [19]
Robbins et al.

[11] Patent Number: 6,147,713
[45] Date of Patent: Nov. 14, 2000

[54] DIGITAL SIGNAL PROCESSOR FOR MULTISTANDARD TELEVISION RECEPTION

[75] Inventors: Clyde Robbins, Maple Glen; Robert Friedman, Jamison; Muhammad Fazili, Horsham, all of Pa.

[73] Assignee: General Instrument Corporation, Horsham, Pa.

[21] Appl. No.: 09/037,292

[22] Filed: Mar. 9, 1998

[51] Int. Cl.[7] .................................................. H04N 5/46
[52] U.S. Cl. ........................... 348/555; 348/738; 348/726
[58] Field of Search .................................... 348/554, 555, 348/553, 726, 725, 738, 484, 482

[56] References Cited

U.S. PATENT DOCUMENTS

| | | | |
|---|---|---|---|
| 4,962,427 | 10/1990 | Lunn et al. | 348/555 |
| 5,029,003 | 7/1991 | Jonnalagadda | 358/142 |
| 5,202,766 | 4/1993 | Mehrgardt et al. | 348/738 |
| 5,293,633 | 3/1994 | Robbins | 455/3.1 |
| 5,355,162 | 10/1994 | Yazalino et al. | 348/555 |
| 5,357,284 | 10/1994 | Todd . | |
| 5,467,141 | 11/1995 | Ligertwood | 348/555 |
| 5,483,298 | 1/1996 | Brilka et al. | 348/738 |
| 5,506,636 | 4/1996 | Patel et al. . | |
| 5,568,206 | 10/1996 | Goeckler | 348/738 |
| 5,570,137 | 10/1996 | Goeckler | 348/726 |
| 5,673,088 | 9/1997 | Nah | 348/738 |
| 5,737,035 | 4/1998 | Rotzoll | 348/725 |
| 5,835,131 | 11/1998 | Limberg . | |
| 5,950,112 | 9/1999 | Hori et al. | 348/725 |

FOREIGN PATENT DOCUMENTS

| | | |
|---|---|---|
| 0 574 273 | 12/1993 | European Pat. Off. . |
| 0 664 645 | 7/1995 | European Pat. Off. . |
| 0 753 945 | 1/1997 | European Pat. Off. . |
| 0 769 873 | 4/1997 | European Pat. Off. . |
| WO 98/14005 | 4/1998 | WIPO . |

*Primary Examiner*—Victor Kostak
*Attorney, Agent, or Firm*—Barry R. Lipsitz; Ralph F. Hoppin

[57] ABSTRACT

A television converter uses digital signal processing (DSP) to provide compatibility with different television standards including NTSC and PAL video standards and FM, BTSC, DIN, Home Theatre, NICAM and independent digital audio standards. Audio processing is accomplished without passing the audio through a Nyquist filter used for video. This eliminates AM to PM conversion improving luminance linearity and differential gain and phase. It also prevents video information from phase modulating the audio intercarrier, thereby eliminating video "buzz" components in the audio. The audio processing includes a synchronous FM demodulator and a separate synchronous FM/QPSK demodulator for handling the different audio standards. Handling historical analog TV standards with DSP also enables the advantageous combination of analog and digital television reception within a single digital VLSI ASIC.

23 Claims, 3 Drawing Sheets

DIGITAL SIGNAL PROCESSOR FOR MULTISTANDARD TELEVISION RECEPTION

BACKGROUND OF THE INVENTION

The present invention relates to television systems, and more particularly to a digital signal processing (DSP) implementation for the video, audio, and data demodulators/receiver of a cable television (CATV) converter, satellite television receiver, multichannel multipoint distribution service (MMDS), or the like.

Cable television services are communicated from a headend via a cable distribution system to subscriber residences. At the subscriber residence, the drop cable which carries the signals from, e.g., a telephone pole, connects the-cable television signals either directly to the subscriber's television set or couples the signals through a converter and/or other subscriber electronics. A converter is necessary if the cable system supplies more than television channels 2 to 13. Only "cable-ready" television sets can tune the higher frequency cable channels above VHF broadcast channel 13. If additional channels, such as pay channels are supplied by the cable operator, they must be translated in frequency down to the frequencies employed by one or more channels to which conventional television sets can be tuned. For example, a cable television converter will typically output the selected cable television channel on the frequency used by broadcast channel 3 or 4, to which the subscriber television will be tuned as long as it is receiving signals from the converter.

Addressable converters are converters that can make channels available or unavailable in accordance with instructions sent in data packets from the cable headend. The converter includes a tuner controlled by the subscriber in order to pick out a specific channel. If a selected service is a premium service, it is scrambled and can be unscrambled only under control of data sent from the headend. Each subscriber has a unique electronic address, so that the cable headend is able to provide viewing authorizations to each addressable converter.

A typical cable television converter will include a frequency converter and filter (for allowing subscribers to tune to desired channels), a local oscillator, control circuits, a data receiver for authorizations, and a descrambler. It should be appreciated that receivers for satellite television and MMDS will contain comparable components. Where digital television signals are to be received in addition to analog signals, appropriate digital components must also be provided, generally including a downconverter for the transmitted digital signals, an analog-to-digital converter, a digital demodulator such as a QAM demodulator, a digital television decoder such as an MPEG decoder, onscreen display circuitry and a video encoder to provide the recovered television signals in an analog format for output to a conventional television.

Various television broadcast standards have been adopted in different parts of the world. These include the National Television Systems Committee (NTSC), phase alternating line (PAL) and SECAM standards. Each of the PAL and NTSC standards have different variations that are used in different parts of the world. For example, one NTSC standard is used in the United States. A somewhat different standard is used in Japan, and a variant thereof is used in Korea. Likewise, different variants of PAL have been adopted in different countries. A summary of the different NTSC and PAL television broadcast standards is set forth in Table 1.

TABLE 1

| Video Standard | Audio Standard | Sub-Carrier | Comment |
|---|---|---|---|
| NTSC | FM-Mono | | US |
| NTSC | BTSC Stereo | SAP | US |
| NTSC | FM/FM | CUE | Japan |
| NTSC | DIN (Variant) | Channel ID | Korea |
| NTSC | Mono-Privacy | | Proprietary |
| NTSC | Stereo-Privacy | | Proprietary |
| NTSC | Home-Theater (AC1) | | Proprietary |
| PAL-B/G | FM-Mono | | |
| PAL-B/G | NICAM | | DQPSK |
| PAL-B/G | DIN | Channel ID | Germany |
| PAL-D | FM-Mono | | China |
| PAL-I | FM-Mono | | |
| PAL-I | NICAM | | |
| PAL-M | FM-Mono | | Brazil |
| PAL-N | FM-Mono | | Argentina |
| — | Music Choice | | DQPSK/AC1 |

It would be advantageous to provide a cable television converter, satellite receiver, MMDS receiver, or the like that is able to process television signals regardless of the video standard used. However, in order to be economical, such converters must be able to be produced at low cost. This has been a difficult obstacle in the past, since different video standards required different circuitry including separate demodulators, filters, and associated components which rendered the cost of the final product prohibitive. Thus, multistandard television converters have not been made available.

It would be advantageous to provide a television converter that is capable of recovering video and audio signals according to different television standards. It would be further advantageous to implement such apparatus using digital signal processing techniques for both analog and digital television signal inputs. It would be still further advantageous to provide such a converter that is economical to produce using, e.g., a low cost very large scale integration (VLSI) application specific integrated circuit (ASIC) to provide the majority of the converter functions.

The present invention provides a converter having the aforementioned and other advantages.

SUMMARY OF THE INVENTION

In accordance with the present invention, a digital signal processor is provided for recovering video and audio signals according to different analog and digital television standards. The signal processor comprises a video demodulator having a first path for coupling a modulated video signal to a mixer via a Nyquist filter, and a second path for coupling the modulated video signal to a carrier recovery circuit without passing through the Nyquist filter. The modulated video signal conforms to a particular television standard, such as any of the standards set forth in Table 1. The carrier recovery circuit (i) recovers a carrier frequency signal for use by the mixer in providing a baseband video signal and (ii) detects an audio intercarrier present in the modulated video signal. A programmable sound strip filter is provided to filter audio components from the baseband video signal in accordance with the particular television standard to provide a demodulated video output. The audio intercarrier is provided as an output from the carrier recovery circuit for subsequent recovery of audio in accordance with the particular television standard.

In an illustrated embodiment, the digital signal processor receives the modulated video signal at an intermediate frequency (IF). An analog-to-digital converter is provided for sampling the IF modulated signal at a sampling frequency $F_s$ to digitize the signal for input to the video demodulator. In a preferred embodiment, the sampling frequency $F_s$ is an integer multiple of the intermediate frequency. For example, the sampling frequency $F_s$ can be 27 MHz with the intermediate frequency either 6.75 MHz or 9.0 MHz. This arrangement is advantageous since both 6.75 MHz and and 9 MHz divide evenly into the sampling frequency of 27 MHz. The demodulated video output can be a digital signal sampled at a frequency $F_s$ of 13.5 MHz. The sampling frequency can be phase locked to a horizontal synchronization component of the baseband video signal.

The digital signal processor can further comprise a tuner for retrieving the modulated video signal from a band of signals. The particular television standard to which the modulated video signal corresponds may be identified by a channel map responsive to the tuner. Alternatively, the modulated video signal can carry tag data indicative of the particular television standard to which the modulated video signal corresponds.

The digital signal processor can further comprise means for delaying the carrier frequency signal prior to the mixer to compensate for a delay introduced by the Nyquist filter.

An audio demodulator is provided in the digital signal processor for processing the audio intercarrier. In an illustrated embodiment, the audio demodulator comprises a first synchronous demodulator for selectively demodulating a first FM modulated audio signal or a QPSK modulated audio signal carried by the audio intercarrier. A second synchronous demodulator demodulates a second FM modulated audio signal carried by the audio intercarrier. The first and second synchronous demodulators can comprise linear phase locked loops that enable demodulation of the audio intercarrier with preliminary bandpass filtering. The video demodulator, carrier recovery circuit, programmable sound strip filter and audio demodulator can all be implemented on a single integrated circuit chip.

In an embodiment where the particular television standard to which the modulated video signal corresponds is identified by a channel map responsive to a tuner, the first synchronous demodulator is responsive to the channel map for selectively demodulating either the first FM modulated audio signal or the QPSK modulated audio signal.

In an embodiment where the modulated video signal carries tag data indicative of the particular television standard to which the modulated video signal corresponds, the first synchronous demodulator is responsive to the tag data for selectively demodulating either the first FM modulated audio signal or the QPSK modulated audio signal.

The present invention also contemplates a digital signal processor for recovering video and audio signals according to different analog and digital television standards in which an audio demodulator is provided for processing an audio intercarrier. The audio demodulator includes a first synchronous demodulator for selectively demodulating a first FM modulated audio signal or a QPSK modulated audio signal carried by the audio intercarrier. A second synchronous demodulator in the audio demodulator is provided for demodulating a second FM modulated audio signal carried by the audio intercarrier. The first and second demodulators can comprise linear phase locked loops that enable the modulation of the audio intercarrier with preliminary bandpass filtering.

The first synchronous demodulator can comprise a QPSK demodulator having first and second output stages. One of the output stages is an I output stage and the other is a Q output stage, where I and Q are QPSK constellation axes that are offset by 90 degrees. A variable oscillator provides first and second phase shifted oscillator outputs having a frequency dictated by a demodulation control signal. The first oscillator output is associated with the first output stage and the second oscillator output is associated with the second output stage of the QPSK demodulator. A phase locked loop controls the variable oscillator in response to an output from a particular one of the first and second output stages. A selector is provided for selectively outputting a QPSK signal from the particular one of the first and second output stages or an FM signal from the phase locked loop.

Apparatus is provided for recovering video and audio signals according to different analog and digital television standards. The apparatus includes a tuner for selecting a TV channel signal. The TV channel signal conforms to a particular television standard. Means are provided for digitizing the television channel IF signal. Intermediate frequency digitization is effective for demodulating both analog and digital modulation formats. Means are provided for identifying the particular television standard to which the TV channel signal conforms. A video digital signal processor (DSP) responsive to the identifying means demodulates the selected digitized TV channel signal to provide a video output signal. An audio DSP responsive to the identifying means demodulates the selected digitized TV channel signal to provide a video output signal. An audio DSP responsive to the identifying means demodulates the selected digitized TV channel signal to provide an audio output signal. The identifying means, digitizing means, video DSP and audio DSP reside together on a integrated circuit chip.

A data DSP can be provided on the integrated circuit chip for demodulating auxiliary data carried in the TV channel signal to provide an auxiliary data output signal. The apparatus can further comprise a data modulator on the integrated circuit chip. The data modulator modulates return path data to be communicated from the apparatus to a remote location.

DETAILED DESCRIPTION OF THE INVENTION

The present invention combines the video, audio and data demodulator/receiver functions of a television converter into an economical package. In a preferred embodiment, these functions are implemented in a single integrated circuit such as an ASIC. The inventive implementation of the television converter functions using DSP techniques eliminates the need for a plurality of fixed bandpass filters and discriminators to do multistandard processing. In this manner, a plurality of different television standards can be accommodated by a single converter. Sampling frequencies are chosen in a manner which enables the simple and cost effective use of a standard master clock frequency, such as the 27 MHz clock used by the Motion Picture Experts Group (MPEG) standard and as specified in ITU-R BT.601. Hardware requirements are significantly reduced by using, for example, one demodulator for both FM and/or QPSK signals.

Figure 1:
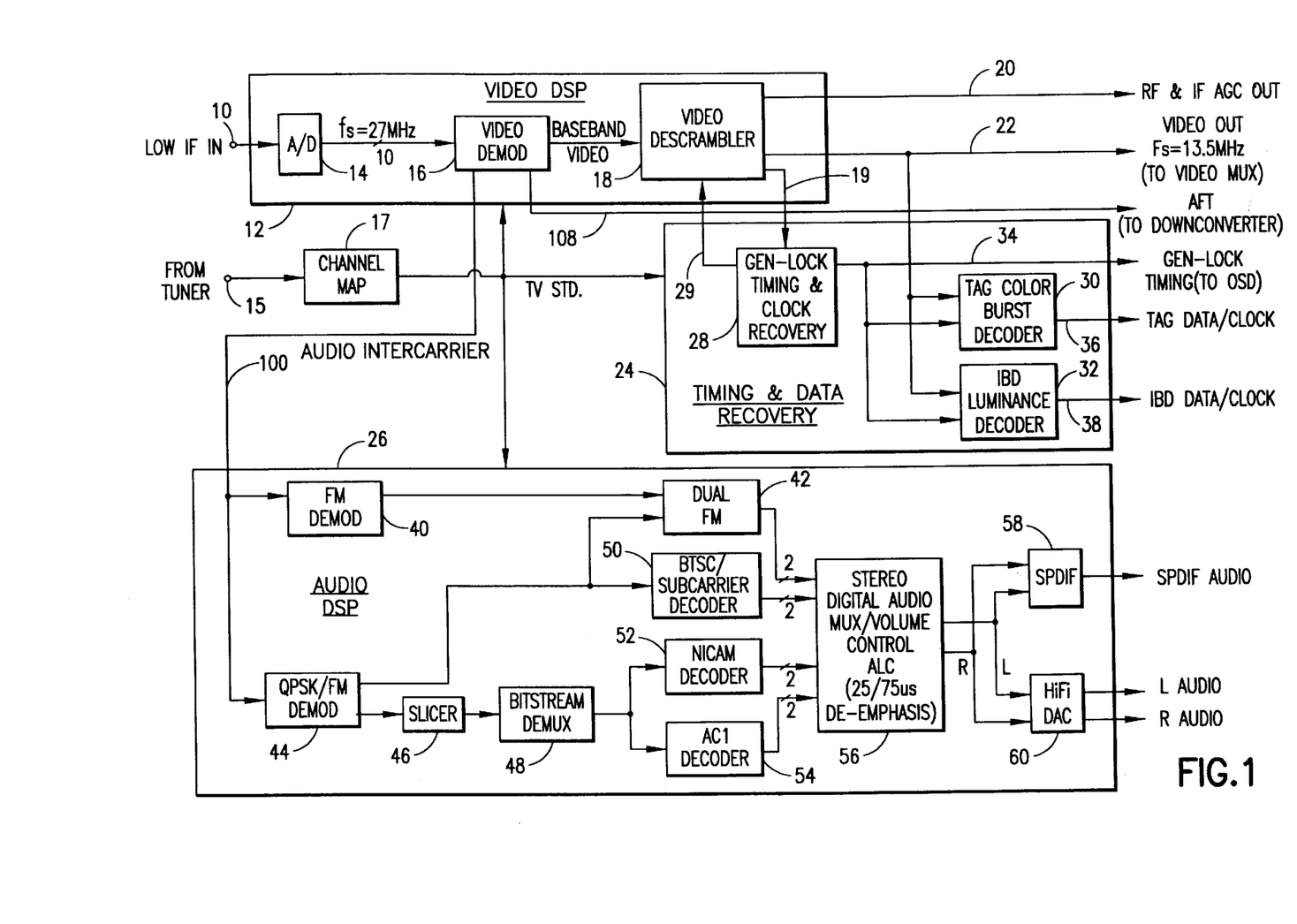
FIG. 1 is a block diagram of a digital signal processing implementation of a baseband television converter in accordance with the present invention.

An overall block diagram of the television converter is illustrated in FIG. 1. The converter includes a video DSP 12, audio DSP 26, and timing and data recovery circuitry 24. The video DSP demodulates and unscrambles video from an intermediate frequency (IF) carrier. The carrier can comprise, for example, a low IF frequency carrier such as a carrier centered at 9 MHz plus or minus 100 KHz. The video DSP consists of an analog-to-digital (A/D) converter 14, video demodulator 16, and a video descrambler 18. The low IF input via terminal 10 is sampled by the A/D converter 14. The sampling rate $F_s$ can be, for example, 27 MHz. Such a rate is advantageous because it conforms with the master clock rate used in the MPEG standard and ITU-R BT.601.

The video demodulator 16 (illustrated in greater detail in FIG. 2) receives the sampled video from A/D converter 14 and provides various outputs. A baseband video output without sound carriers is provided to video descrambler 18. The baseband video may be advantageously provided at a 13.5 MHz sampling rate. The video descrambler 18 descrambles the baseband video in accordance with well known techniques to provide an unscrambled baseband video output on line 22 at the sampling frequency $F_s$ of, e.g., 13.5 MHz. RF and IF automatic gain control (AGC) voltages are also output from the video DSP 12 via line 20.

In addition to the baseband video, video demodulator 16 outputs an automatic fine tune (AFT) control voltage on line 108 and an audio intercarrier on line 100. Before outputting the audio intercarrier, a mixer/phase detector 94 (FIG. 2) cancels the AM modulated video components. The audio intercarrier can be provided, for example, at a 27 MHz sampling rate.

The video descrambler 18 also outputs a synchronization detection signal on line 19 which is derived from the recovered video. This signal is input to a Gen-Lock Timing & Clock Recovery circuit 28, which is part of the timing and data recovery block 24. Circuit 28 recovers the horizontal sync, vertical sync, blanking, and inversion restore timing (used for descrambling video inverted signals) which are forwarded back to the video descrambler via line 29 for use in descrambling the video output by video demodulator 16. Circuit 28 also outputs a Gen-Lock timing signal on line 34 for use by the onscreen display circuitry of the converter. The onscreen display circuitry provides text and graphics for display on the subscriber's television in a conventional manner.

The timing and data recovery block 24 also includes a tag color burst decoder 30 which outputs tag data and a clock on line 36. Tag data is data that is encoded onto the color burst of the video signal and used- for various converter control functions, including descrambling. Inband data (IBD) carried on the luminance portion of the video signal is decoded by an IBD luminance decoder 32, and output via line 38 together with an associated clock signal. In a preferred embodiment, the clock signals provided with the tag data and IBD data will be integer related to the master clock frequency of, e.g., 27 MHz.

The audio DSP portion 26 of the converter includes an audio demodulator and baseband processing functions. The audio portion of a video signal may be composed of one or two carriers. The carrier may have one or more subcarriers. When a single FM carrier is present, it is demodulated by an FM demodulator 40. The capability of demodulating a second FM carrier is provided by a combined QPSK/FM demodulator 44. If one QPSK and one FM channel are provided, FM demodulator 40 will be used to demodulate the FM channel and QPSK/FM demodulator 44 will be used to demodulate the QPSK channel.

In the event that two FM channels are provided, the demodulated signals are decoded in a dual FM decoder 42 to provide a digital output to a stereo digital audio MUX/volume control circuit 56. This circuit processes the decoded signals to provide left and right stereo channel outputs for input to a digital interface circuit 58 (e.g., a Sony-Phillips Digital Interface—"SPDIF") and a high fidelity digital-to-analog converter 60. Circuit 58 outputs a digital audio (e.g., SPDIF) signal. Digital-to-analog converter 60 outputs analog left and right audio signals for input to a conventional audio amplifier.

In the event that the QPSK/FM demodulator 44 recovers a carrier having a Broadcast Television Systems Committee (BTSC) audio subcarrier, the subcarrier is decoded in decoder 50 for input to circuit 56. Similarly, where a NICAM audio signal is recovered by the demodulator 44, it is decoded in a decoder 52. A Dolby AC1 audio signal recovered by demodulator 44, when present, is decoded by decoder 54. Prior to decoding, any NICAM or Dolby AC1 signal is sliced in a slicer 46 and demultiplexed in a bitstream demultiplexer 48 to recover-the digital data provided by the NICAM or Dolby AC1 signals.

As indicated above, the audio DSP 26 is capable of processing various audio modes. Table 2 sets forth the various types of audio carriers that can be processed.

TABLE 2

| Audio Mode | Primary Carrier | Modu-lation | Secondary Carrier | Modu-lation |
|---|---|---|---|---|
| BTSC | 4.5 MHz | FM | NONE | — |
| PRIVATE BTSC | 4.75 MHz | FM | 4.5 MHz | FM |
| PRIVACY (NTSC) | 4.5 MHz | FM-FM | NONE | — |
| HOME THEATRE | 4.5 MHz | QPSK | NONE | — |
| EIA-J | 4.5 MHz | FM-FM | NONE | — |
| GERMAN DIN | 5.5 MHz | FM | 5.742 MHz | FM |
| KOREAN DIN | 4.5 MHz | FM | 4.7242 MHz | FM |
| PAL I | 6 MHz | FM | 6.552 MHz | QPSK |
| PAL B | 5.5 MHz | FM | 5.85 MHz | QPSK |

As indicated in Table 2, various modes including the private BTSC, German DIN, Korean DIN, PAL I and PAL B modes include a primary carrier as well as a secondary carrier. Where two FM carriers are provided, as in the private BTSC, German DIN and Korean DIN modes, one will be processed by FM demodulator 40 and the other by demodulator 44. All QPSK demodulation is provided by the QPSK/FM demodulator 44. The QPSK modulation provided in the secondary carrier of the two PAL modes represents a NICAM digital audio signal which is subsequently processed by NICAM decoder 52. In the home theatre audio mode, the QPSK modulation of the primary carrier provides a Dolby AC1 digital audio signal, which is decoded by the AC1 decoder 54. Further details of the FM demodulator 40 and QPSK/FM demodulator 44 are provided in connection with the description of FIG. 3.

Figure 2:
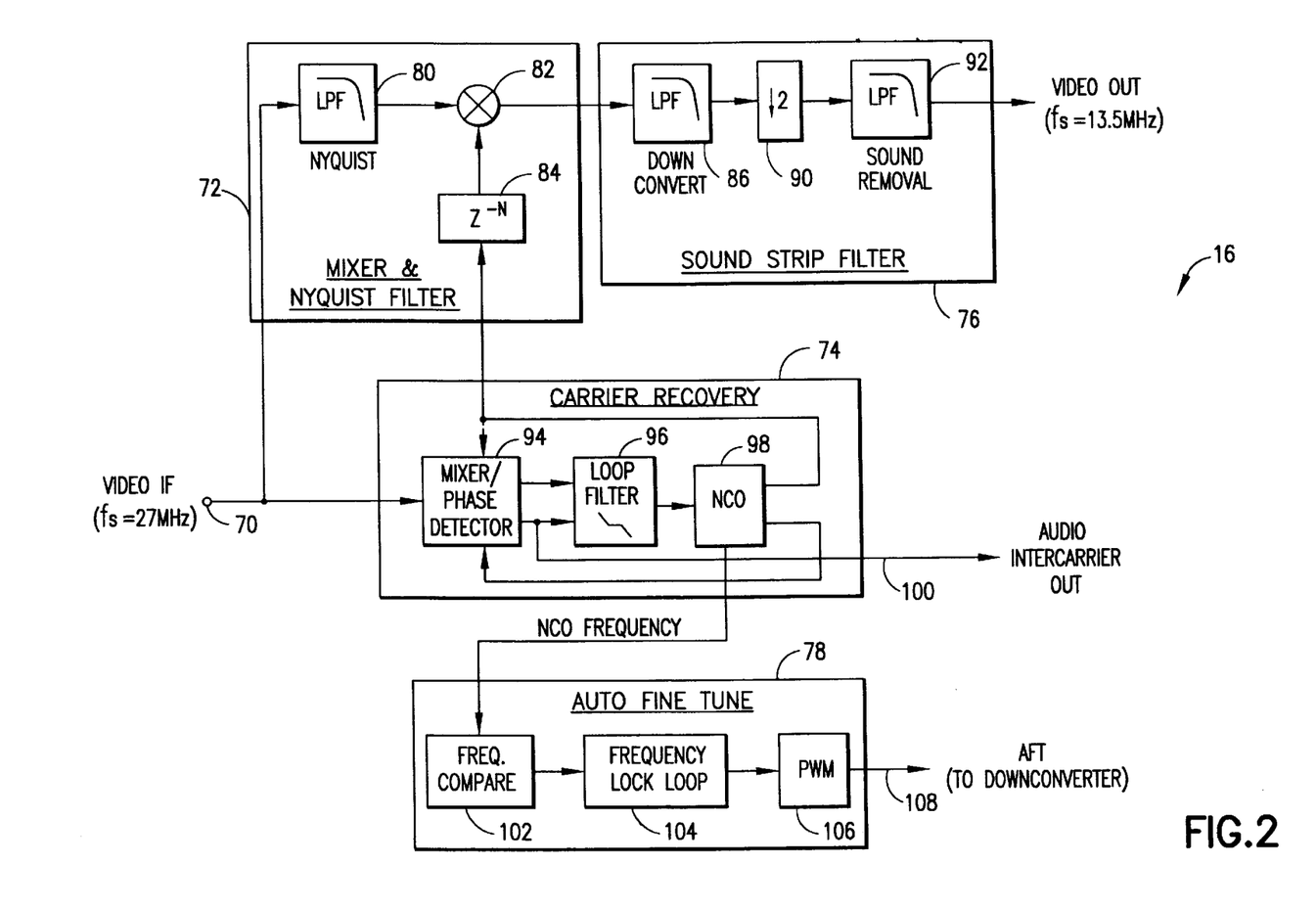
FIG. 2 is a more detailed block diagram of the video demodulator section of the video DSP portion of FIG. 1.

FIG. 2 illustrates the video demodulator 16 in greater detail. This demodulator can process both amplitude modulated (vestigial sideband—"VSB") large carrier and amplitude modulated suppressed carrier with pilot AM signals. The only difference between the two demodulation systems is in the carrier recovery block 74. More particularly, the mixer/phase detector 94 provided in the carrier recovery block may be implemented either as a Costas loop or a quadrature phase lock loop, both of which are well known in the art. A Costas loop is capable of recovering the carrier from both AM (vestigial sideband) large carrier and suppressed carrier with pilot AM signal sources. The quadrature phase lock loop (QPLL) is only capable of demodulating large carrier signals.

The input to the video demodulator is a video IF signal that may be sampled, for example, at 27 MHz. This is the signal output from A/D converter 14 of FIG. 1, and is input to the video demodulator via terminal 70 illustrated in FIG. 2. This signal is input both to a mixer and Nyquist filter block 72 and the carrier recovery block 74. In the mixer and Nyquist filter block 72, the video IF is first Nyquist filtered via Nyquist filter 80 and then downconverted to baseband by mixing it with the recovered carrier in mixer 82. The recovered carrier is first passed through a Nyquist delay 84 which compensates for the delay of the Nyquist filter 80. The Nyquist filter is a lowpass filter that provides additional adjacent channel filtering as well as VSB double-single sideband magnitude equalization. For NTSC signals, the double sideband component is from 0–0.75 MHz and the single sideband component is from 0.75–4.2 MHz.

The Nyquist filter 80 can be implemented as a finite impulse response (FIR) lowpass filter having, for example, a sampling frequency of 27 MHz, passband edge of 7.75 MHz, passband attenuation of 0.5 dB, stopband edge of 10.25 MHz, stopband attenuation of 40 dB, beta of 3.3953 and −6 dB cutoff frequency of 9 MHz. The FIR filter can be implemented as a 27 tap filter with fixed coefficients.

The output of mixer 82 is input to a sound strip filter 76. A baseband video output (e.g., having a sampling frequency $f_s$ of 13.5 MHz) is generated from the demodulated video by removing the audio signal components. The audio components are removed by the sound strip filter. Filtering is performed in a two-stage filtering process using a downconverter lowpass filter 86 and a sound removal lowpass filter 92. A decimate by two circuit 90 is provided between the two lowpass filters.

The use of a two-stage filtering process in the sound strip filter 76 reduces hardware requirements.

The first stage provided by LPF 86 and decimator 90 decimates by two the 27 MHz sample modulated video to 13.5 MHz. Filter 86 is an anti-aliasing lowpass filter which may comprise, for example, an FIR half-band lowpass filter. For example, the desampling frequency of the filter 86 can be 27 MHz with an operating frequency of 13.5 MHz, passband edge of 5.5 MHz, passband attenuation of 0.5 dB, stop band edge of 8 MHz, stop band attenuation of 60 dB, and the filter can have, e.g., 37 taps with fixed coefficients. A half band filter is utilized to reduce gate count. Due to the 2:1 decimation, this is filter operates at 13.5 MHz since every other sample is ignored. Since a half-band filter is used, the passband and stop band are centered around one-fourth the sampling frequency (27 MHz) or 6.75 MHz.

The last stage of the sound strip filter 76 is an FIR lowpass filter 92. This filter can be designed, for example, to provide the sound carrier at 50 dB below the video at the sound carrier, and 25 dB below video at the sound carrier ±50 KHz. The coefficients of this filter are programmable to accommodate all of the different video standards capable of being processed by the television converter. The number of taps of the filter can be determined by the video standard with the smallest pass-to-stop transition bandwidth. NTSC has the smallest transition bandwidth, which is 696 KHz.

As indicated above, carrier recovery is provided by block 74. The video IF from terminal 70 is input to a mixer/phase detector 94, the output of which is filtered through a loop filter 96 that controls a numerically controlled oscillator (NCO) 98. The NCO operates like a voltage controlled oscillator (VCO) and can be phase locked to an external clock by modulating its phase error input.

One output of the mixer/phase detector 94 is the audio intercarrier which is carried with the video IF. The audio intercarrier is output via line 100 so that it can be input directly into the audio DSP 26 (see FIG. 1). Advantageously, the video demodulator is designed such that the sound takeoff point at the output of mixer/phase detector 94 does not require the sound to go through the Nyquist filter 80. Thus, there is no need for a separate sound demodulator which would render the system more expensive. Both the loop filter 96 and NCO 98 are programmable to enable operation with different television standards.

The NCO output frequency is provided to an automatic fine tune circuit 78. The NCO frequency is compared in a frequency comparison circuit 102 with the actual frequency at which the video IF signal is received. A frequency lock loop 104 is controlled by the output of frequency compare circuit 102 in order to automatically fine tune the actual operating frequency. The output of the frequency lock loop is pulse width modulated in circuit 106 to provide an automatic fine tune (AFT) signal via line 108. The AFT signal is used by a conventional downconverter (not shown) in the television converter, to provide the low IF input to the video DSP via terminal 10 of FIG. 1.

Figure 3:
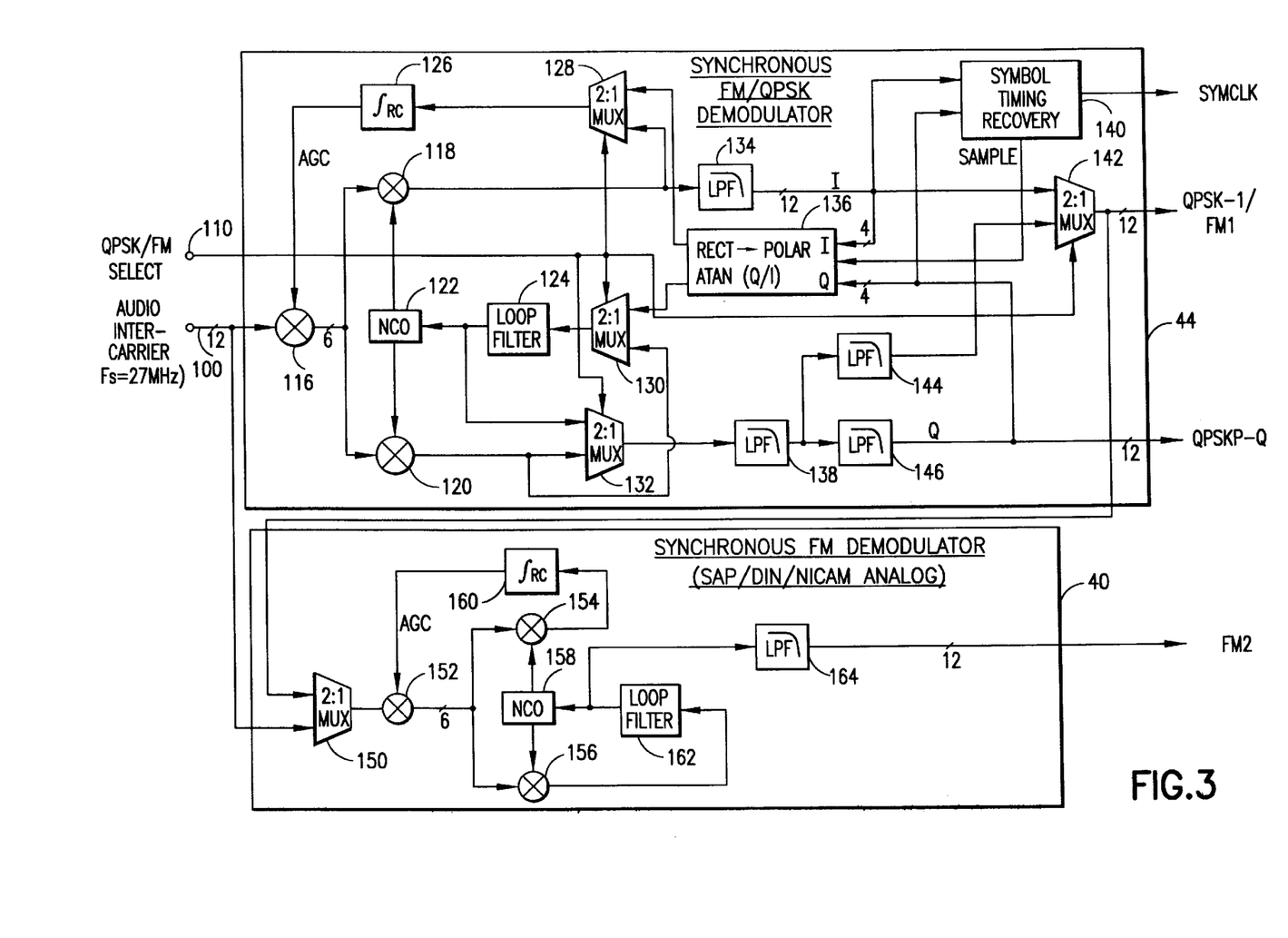
FIG. 3 is a more detailed block diagram of the FM and QPSK/FM demodulators used in the audio DSP portion of FIG. 1.

FIG. 3 illustrates the FM demodulator 40 and QPSK/FM demodulator 44 of the audio DSP 26 in greater detail. Demodulator 44 is a synchronous demodulator that is configurable to perform either FM or QPSK demodulation. Demodulator 40 is a synchronous demodulator used for FM demodulation only. The audio intercarrier is provided on line 100 to both demodulators 40 and 44. In demodulator 40, the audio intercarrier is provided via a 2:1 multiplexer (used as a selector) to a mixer 152 which provides automatic gain control (AGC). The output of mixer 152 is input to mixers 154 and 156 where the signal is mixed with appropriate frequency outputs from a numerically controlled oscillator 158. The output of mixer 156 is passed through a loop filter 162 to control the frequency at which NCO 158 operates. The output of loop filter 162 is also passed through a lowpass filter 164 to provide the demodulated FM output. The output of mixer 154 is integrated in integrator 160 to provide the AGC signal.

Multiplexer 150 provides the audio intercarrier as an output to mixer 152 when the audio mode is either a DIN mode (which requires two carriers for stereo) or PAL, in which case demodulator 40 demodulates the FM modulation of the primary carrier. For FM stereo or second audio program (SAP) signals, multiplexer 150 passes the "FM1" signal from multiplexer (i.e., selector) 142 of demodulator 144 to the mixer 152 of demodulator 40.

Synchronous FM/QPSK demodulator 44 receives a QPSK/FM select signal at terminal 110 in order to set up the demodulator for QPSK or FM demodulation. The audio intercarrier is input to a mixer 116 which provides an AGC signal from integrator 126. The output of mixer 116 is coupled to mixers 118 and 120 which receive the outputs of a programmable NCO 122. The NCO is programmable to accommodate the various standards capable of being processed by the converter.

A loop filter 124 is provided to maintain the nominal frequency at which NCO 122 operates. Where a QPSK signal is being demodulated, loop filter 124 receives the "Q" phase of the QPSK signal from mixer 120 via multiplexer (i.e., selector) 130. When the demodulator is demodulating an FM signal, the multiplexer 130 is actuated via the QPSK/FM select signal input at terminal 110 to pass the arc tangent (Q/I) from a rectangular to polar coordinate converter 136 to loop filter 124. The QPSK/FM select signal also controls a multiplexer (selector) 128 to provide an appropriate input to integrator 126 in order to provide the necessary AGC signal. At the same time, the QPSK/FM select signal actuates a multiplexer (selector) 142 to output either a demodulated FM signal from lowpass filter 144 or the I component of a demodulated QPSK signal from lowpass filter 134. Filter 132 can comprise a root raised cosine (RRC) FIR filter and adaptive equalizer, a counterpart of which is provided as filter 138 for the Q component of the demodulated QPSK signal. The Q component is passed through a second lowpass filter 146 (which may also be a RRC FIR filter) prior to being output from the demodulator 44. Both the I and Q components output from the respective lowpass filters 134 and 146 are input to the rectangular to polar coordinate converter 136, which also receives a sample symbol timing recovery output from symbol timing recovery circuit 140. This circuit outputs a symbol clock (SYMCLK) signal for use by the television converter.

When an FM signal is demodulated by demodulator 44, the FM output is taken from the output of loop filter 124, passed through multiplexer (selector) 132, and lowpass filtered in lowpass filters 138 and 144 prior to being output via multiplexer 142.

It should be clear from FIG. 3 that an audio signal carried by the audio signal intercarrier can comprise either FM modulation, QPSK modulation, or both where separate carriers are provided. Thus, any of the audio modes set forth in Table 2 can be accommodated.

It should now be appreciated that the present invention provides a reduced cost television converter implemented using digital signal processing techniques. In the video demodulator section, a sampling frequency of 27 MHz is advantageous (but not required) in order to handle PAL 1, PAL B and NTSC television signals without aliasing during the demodulation. Such aliasing is prevented because the sum products are below the frequency where they would alias back into the DC to 7 MHz band of concern. A low IF input is converted from an analog signal to a digital signal, which is applied to a Nyquist filter. In a preferred implementation, the Nyquist filter can comprise a 9 MHz, –6 dB symmetrical linear slope type filter. A gain control multiplier is used to restore scrambled video modes to a correct level. A 9 MHz NCO is phase locked to the Nyquist filtered video carrier and applied to I and Q multipliers. The difference product is the desired baseband video signal. After demodulation, the video signal can be decimated (e.g., down to 13.5 MHz sampling) before further processing is performed. In a preferred embodiment, the video PLL (phase lock loop) bandwidth is about 200 KHz initially during tuning and reduced to about 25 KHz after lock is detected. This multirate loop in the DSP design is useful during tuning acquisition to speed lock time and widen the capture range.

The Q multiplier is used for AFC and intercarrier generation. It is connected before the descrambling gain control stage to prevent AM modulation from being applied to the intercarrier. A delay matching the delay of the gain control multiplier must be inserted in the path before the Q multiplier in order to maintain the correct quadrature phase relationship. Connecting the Q multiplier before the Nyquist filter with appropriate delay reduces AM to PM conversion and improves suppressed carrier operation. The I multiplier is decimated by two and FIR filtered to remove the sound carrier(s). The FIR filter is coefficient programmable to the video standard in use.

The converter enables the reception of digital audio independent of video (for example, for an audio only digital music channel). In such a case, the video carrier NCO must be set to a fixed frequency mode in order to mix the desired QPSK carrier to the desired intercarrier frequency.

The television converter can receive various modes of audio signals. For analog FM audio, the video demodulator quadrature output at, e.g., 27 MHz is used as the source of audio intercarriers. About 40 dB cancellation can be expected from the quadrature output assuming that the picture was originally modulated by a good quality analog video modulator. Video cancellation reduces audio filter complexity. Intercarrier processing is necessary because of up and down conversion phase noise. A linear PLL demodulator with AGC can be used to extract the FM modulation while providing at least 40 dB AM rejection. Due to linear down conversion, very little video AM is present on the sound carrier. Hum amplitude modulation is eliminated by the AGC loop. The PLL demodulator is also used for DIN applications.

For digital audio, an intercarrier PLL can include a ROM lookup table for carrier recovery when used in the QPSK modes. Clock recovery is also included. The output of the I and Q multipliers is decimated down to a low sampling rate for efficient lowpass filtering and then interpolated back up before data sampling is applied. One filter can be used for PAL 1, PAL B, and AC-1. Only the NCO frequency will be changed for these various modes. The demodulated data is demultiplexed, decrypted if authorized, Dolby AC-1 decoded, volume controlled, and output via a digital analog converter for left and right stereo audio outputs. A digital audio output, e.g., complying with the Sony-Phillips Digital Interface (SPDIF), is also provided. Similar processing is provided for NICAM data when present.

In the illustrated embodiment, the video carrier phase lock loop (PLL) is placed before the Nyquist for AM-VSB, and compensating delay is inserted in the NCO path to the multiplier after the Nyquist filter. This eliminates AM to PM conversion, improving luminance linearity and differential gain and phase. This design also keeps the video information from phase modulating the audio intercarrier, thereby eliminating video "buzz" components in the audio. The Nyquist filter is a programmable FIR filter, either highpass or lowpass, to allow the tuner oscillator to be higher or lower than the desired channel. In other words, the digitized IF video carrier can be above the sound carrier or below the sound carrier. Example video carrier frequencies are 6.75 MHz for highpass and 9 MHz for lowpass.

Although the invention has been described in connection with various specific embodiments, it should be appreciated that numerous adaptations and modifications may be made without departing from the scope of the invention as set forth in the claims.

What is claimed is:

1. A digital signal processor for recovering video and audio signals according to different analog and digital broadcast standards, comprising:

a video demodulator having a first path for coupling a modulated video signal to a mixer via a Nyquist filter, and a second path for coupling said modulated video signal to a carrier recovery circuit without passing through said Nyquist filter, said modulated video signal conforming to a particular broadcast standard;

said carrier recovery circuit (i) recovering a carrier frequency signal for use by said mixer in providing a baseband video signal and (ii) detecting an audio intercarrier present in said modulated video signal; and a programmable sound strip filter for filtering audio components from said baseband video signal in accordance with said particular broadcast standard to provide a demodulated video output;

wherein said audio intercarrier is provided as an output from said carrier recovery circuit for subsequent recovery of audio in accordance with said particular broadcast standard.

2. A digital signal processor in accordance with claim 1 wherein said modulated video signal is provided at an intermediate frequency (IF), further comprising an analog to digital converter for sampling the IF modulated video signal at a sampling frequency $f_s$ to digitize said signal for input to said video demodulator.

3. A digital signal processor in accordance with claim 2 wherein said sampling frequency $f_s$ is an integer multiple of said intermediate frequency.

4. A digital signal processor in accordance with claim 3 wherein said intermediate frequency is 6.75 MHz or 9.0 MHz and said sampling frequency $f_s$ is 27 MHz.

5. A digital signal processor in accordance with claim 4 wherein said demodulated video output is a digital signal sampled at a frequency $F_s$ of 13.5 MHz.

6. A digital signal processor in accordance with claim 2 wherein said sampling frequency is phase locked to a horizontal synchronization component of said baseband video signal.

7. A digital signal processor in accordance with claim 1, wherein said modulated video signal is retrieved from a band of signals by a tuner, and the particular broadcast standard to which said modulated video signal corresponds is identified by a channel map responsive to said tuner.

8. A digital signal processor in accordance with claim 1, wherein said modulated video signal carries tag data indicative of the particular broadcast standard to which the modulated video signal corresponds.

9. A digital signal processor in accordance with claim 1, further comprising:

means for delaying said carrier frequency signal prior to said mixer to compensate for a delay introduced by said Nyquist filter.

10. A digital signal processor in accordance with claim 1 wherein an audio demodulator is provided for processing said audio intercarrier, said audio demodulator comprising:

a first synchronous demodulator for selectively demodulating a first FM modulated audio signal or a QPSK modulated audio signal carried by said audio intercarrier; and a second synchronous demodulator for demodulating a second FM modulated audio signal carried by said audio intercarrier.

11. A digital signal processor in accordance with claim 10, wherein said first and second synchronous demodulators comprise linear phase locked loops that enable demodulation of said audio intercarrier with preliminary bandpass filtering.

12. A digital signal processor in accordance with claim 10 wherein said video demodulator, carrier recovery circuit, programmable sound strip filter and audio demodulator are all implemented on a single integrated circuit chip.

13. A digital signal processor in accordance with claim 10 wherein:

said modulated video signal is retrieved from a band of signals by a tuner;

the particular broadcast standard to which said modulated video signal corresponds is identified by a channel map responsive to said tuner; and said first synchronous demodulator is responsive to said channel map for selectively demodulating either said first FM modulated audio signal or said QPSK modulated audio signal.

14. A digital signal processor in accordance with claim 10 wherein:

said modulated video signal carries tag data indicative of the particular broadcast standard to which the modulated video signal corresponds; and said first synchronous demodulator is responsive to said tag data for selectively demodulating either said first FM modulated audio signal or said QPSK modulated audio signal.

15. A digital signal processor in accordance with claim 1, wherein:

the particular broadcast standard comprises a television standard.

16. A digital signal processor for recovering video and audio signals according to different analog and digital broadcast standards, comprising:

an audio demodulator for processing an audio intercarrier;

a first synchronous demodulator in said audio demodulator for selectively demodulating a first FM modulated audio signal or a QPSK modulated audio signal carried by said audio intercarrier; and a second synchronous demodulator in said audio demodulator for demodulating a second FM modulated audio signal carried by said audio intercarrier.

17. A digital signal processor in accordance with claim 16 wherein said first and second demodulators comprise linear phase locked loops that enable demodulation of said audio intercarrier with preliminary bandpass filtering.

18. A digital signal processor in accordance with claim 16 wherein said first synchronous demodulator comprises:

a QPSK demodulator having first and second output stages, one of said output stages being an I output stage and the other being a Q output stage;

a variable oscillator for providing first and second phase-shifted oscillator outputs having a frequency dictated by a demodulation control signal, said first oscillator output being associated with said first output stage and said second oscillator output being associated with said second output stage;

a phase locked loop for controlling said variable oscillator in response to an output from a particular one of said first and second output stages; and a selector for selectively outputting a QPSK signal from the particular one of said first and second output stages or an FM signal from said phase locked loop.

19. A digital signal processor in accordance with claim 16, wherein:

the broadcast standards comprise television standards.

20. Apparatus for recovering video and audio signals according to different analog and digital broadcast standards, comprising:

a tuner for selecting a broadcast channel signal, said broadcast channel signal conforming to a particular broadcast standard;

means for digitizing said broadcast channel signal;

means for identifying the particular broadcast standard to which said broadcast channel signal conforms;

a video digital signal processor (DSP) responsive to said identifying means for demodulating the selected digitized broadcast channel signal to provide a video output signal; and an audio DSP responsive to said identifying means for demodulating the selected digitized broadcast channel signal to provide an audio output signal;

said identifying means, digitizing means, video DSP and audio DSP residing together on an integrated circuit chip.

21. Apparatus in accordance with claim 20 further comprising, on said integrated circuit chip:

a data DSP for demodulating auxiliary data carried in said broadcast channel signal to provide an auxiliary data output signal.

22. Apparatus in accordance with claim 20 further comprising, on said integrated circuit chip:

a data modulator for modulating return path data to be communicated from said apparatus to a remote location.

23. Apparatus in accordance with claim 18, wherein:

the particular broadcast standard comprises a television standard.

* * * * *